United States Patent
Cook et al.

[11] Patent Number: 6,006,106
[45] Date of Patent: *Dec. 21, 1999

[54] METHOD FOR AUTOMATIC TRANSCEIVER SELECTION IN A MOBILE MULTIPLE RF TRANSCEIVER APPARATUS

[75] Inventors: David P. Cook, Lynchburg; Eric Schaufert, Forest; Robert E. Schmidt, Lynchburg, all of Va.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,494

[22] Filed: Mar. 7, 1997

Related U.S. Application Data

[63] Continuation-in-part of application No. 08/777,883, Dec. 31, 1996, abandoned.

[51] Int. Cl.⁶ .................................................. H04B 1/38
[52] U.S. Cl. ........................ 455/552; 455/426; 455/432; 455/517
[58] Field of Search .................................. 455/426, 421, 455/422, 552, 553, 432, 517–520, 67.1, 226.1–226.3, 8 B, 3, 436, 550, 575, 73

[56] References Cited

U.S. PATENT DOCUMENTS

| | | |
|---|---|---|
| 5,007,050 | 4/1991 | Kasparian et al. . |
| 5,260,988 | 11/1993 | Schellinger et al. ................... 455/552 |
| 5,367,558 | 11/1994 | Gillig et al. ............................ 455/552 |
| 5,517,553 | 5/1996 | Sato ....................................... 455/552 |
| 5,535,430 | 7/1996 | Aoki et al. . |
| 5,553,243 | 9/1996 | Harrison et al. ....................... 455/520 |
| 5,649,298 | 7/1997 | Ablay ..................................... 455/520 |
| 5,701,589 | 12/1997 | Lee et al. ................................. 455/88 |

FOREIGN PATENT DOCUMENTS

| | | |
|---|---|---|
| 0 660 626 | 6/1995 | European Pat. Off. . |
| WO 95 23485 | 8/1995 | WIPO . |
| WO 96 12377 | 4/1996 | WIPO . |

*Primary Examiner*—Doris H. To
*Attorney, Agent, or Firm*—Nixon & Vanderhye P.C.

[57] ABSTRACT

A multi-radio equipment arrangement comprises multiple transceivers of different band splits. A preferred arrangement utilizes at least one transceiver for communicating on digital "trunked" RF communications system and at least one transceiver for communicating on a wide-area "conventional" RF communications system. The multi-radio equipment transceivers communicate with each other and with an equipment control unit via a common internal serial data bus to form a multi-radio local network. Each transceiver incorporates a microprocessor controller that includes appropriate task management and serial bus interface software routines for operating and communicating with other devices on the bus. The control unit provides a user interface comprising conventional radio equipment front-panel controls. A "trunked" system transceiver is automatically selected whenever its measured audio quality exceeds a predetermined user-programmable minimum level. When audio quality falls below the predetermined level, an auto-select control task (ASCT) automatically switches to the "conventional" RF transceiver in a manner transparent to the user. Evaluations of the audio quality on each transceiver are assessed on a continuing periodic basic individually by each transceiver and provided to the ASCT. In addition, a radio-roaming feature automatically switches back and forth between two or more "trunked" communications transceivers depending on audio quality available from each trunked system and a preference selected by the mobile user.

10 Claims, 4 Drawing Sheets

METHOD FOR AUTOMATIC TRANSCEIVER SELECTION IN A MOBILE MULTIPLE RF TRANSCEIVER APPARATUS

This is a continuation-in-part of application Ser. No. 08/777,883 filed Dec. 31, 1996 now abandoned.

FIELD OF THE INVENTION

The present invention relates to radio frequency (RF) transceiver equipment for "conventional" (non-trunked) RF and trunked RF communications systems, and more particularly, to methods and apparatus for automated selection between two or more transceivers in a multi-radio apparatus to obtain the best audio signal quality in a manner that is transparent to the user. Still more particularly, the present invention relates to a method used in a multi-radio transceiver apparatus for automatically switching (selecting) between two limited-area coverage digital trunked communications transceivers or between a conventional wide-area RF communications transceiver and a digital trunked communications transceiver in a multi-radio apparatus.

BACKGROUND AND SUMMARY OF THE INVENTION

Despite continuing beneficial technological advances, radio frequency communications systems will always be constrained within certain physical boundaries by limits on effective transmission range and will always be burdened with effects caused by various geographical and man-made barriers. The present invention specifically addresses these problems by providing the user with an improved multiple radio communications method and apparatus which automatically makes the best use of the equipment and available system resources to insure the highest quality communications at all times.

In both public safety organizations and commercial utility industries mobile radio users often find it necessary to communicate across regionally diverse areas, e.g., state police patrolling a large region of the state may need to remain in contact with city agencies when they are in the vicinity or a fire chief for a local municipality may be called in to support surrounding county agencies. Obviously, many similar situations exist. Different groups or agencies typically use the type of system and equipment that best suits their particular geographical and tactical needs. For example, a large coverage area UHF communications system may be suitable for a state governmental agency whereas a small 900 MHz trunked communications system would be more suitable for a city or municipal agency. Unfortunately, the geographic regions and specific communications needs of each agency or group are often vastly different. So when users of diverse type systems need to communicate to one another, the convenient solution of having them all communicate using the same trunked radio band or using a common conventional radio system is usually not feasible. (For the purpose of the present discussion, a "conventional" radio system—as opposed to a "trunked" system—is defined as frequency modulated (FM) and/or phase-modulated (PM) non-trunking RF communications system).

In the past there were no real solutions to this particular problem. Mobile communications users simply approached the problem by installing and using several different types of RF communications equipment. This resulted in multiple control panels, microphones, and hook switches vying for the typically very limited space available in a mobile environment. Moreover, the added conglomeration of devices still gave the user no insight as to which piece of radio equipment might operate the best at a present location. The user first had to try a radio to know whether or not it would provide satisfactory communications. The only radio known to at least partially address these problems is assignee's own Ericsson-GE ORION™ mobile radio, which combines two transceivers with a single control panel interface. This arrangement is known as a multiple radio apparatus or "multi-radio" and although it somewhat reduces equipment clutter it does nothing to help a mobile user know which transceiver is best to use at his current location.

Where a coordinated trunked communications system arrangement between differing agencies and/or commercial entities is not feasible, a lower cost alternative is to install at least one trunked system transceiver along with at least one conventional RF system transceiver in a "multi-radio" mobile equipment arrangement. In this way a mobile user can monitor, for example, a city agency's 800 MHz trunked site and then switch over to a wide area conventional RF system from the same control panel in order to communicate with a county or state agency that employs the wider coverage area system. Although such multi-radio arrangements may enable a user to hear communications on both transceivers, the user can only respond using one transceiver—i.e., the selected radio transceiver. Moreover, the conventional multi-radio systems require one to manually switch between the two transceivers.

Another current problem with mobile radio RF communications equipment is that sine one cannot physically "see" the radio system coverage boundaries, one has no way of knowing when he has reached the coverage limits of a particular communication system. Moreover, even when operating within the boundaries of a particular system there is no way of knowing when the existing transmission/reception conditions are no longer conductive toward providing high quality communications on that system. Even assuming the option to use other equipment or another type of RF communications system existed, a user would still not be able to determine exactly when it would be most advantageous to switch to the different system or if indeed that system would even be able to provide intelligible communications if the switch was made.

As an example, consider the case where a mobile RF communications user usually works within a large coverage region—for this example, a non-trunking "conventional" RF communications system—but also needs to remain in contact with users in a smaller coverage region which is trunked covered by a digital trunked system. In any digital trunked RF communications system, the quality of the transmission drops off as one leaves the primary coverage area. This results in calls that are unintelligible and places where trunked signaling cannot be decoded. Referring to FIG. 1A, a simplified example of primary (101) and marginal (102) coverage areas of a trunked communications system (100) is illustrated. Note that the area of marginal coverage, indicated by hatched region 102, is not necessarily uniform or consistent.

Typically, the audio quality of communications within a trunked communications system is better than that within the wide-area low-band, UHF or VHF conventional (i.e., non-trunked) system, but the geographical coverage area for most 800 MHz and 900 MHz trunked systems is much smaller. Therefore, if considering communications across two separate RF communications systems where one is a trunked system and the other is a non-trunked conventional RF communications system, the two of which have significantly different size coverage areas, it is usually the case that the smaller coverage area trunked system is contained wholly within the larger coverage area system. An example this type of situation is illustrated by FIG. 1B, where a trunked system 100 is shown contained within larger coverage area conventional RF communications system 110. Understandably, while travelling in the marginal coverage area a mobile user would not want to transmit on the trunked system if the audio quality has significantly decreased. However, if and when the signaling quality over the trunked communications system improves, it is usually preferable that the transmission take place on the trunked system.

With present multi-radio equipment, a user deciding to make a call over the trunked system must select the trunked system radio, "key-up" the transceiver, and just hope that one of the trunked system's base station would receive an intelligible signal. Typically, one would not know that the audio quality over the trunked system was bad until one received a call and could hear the quality of the received transmission. To address problems like these, and to solve the problem of trying to select which RF communications system and radio equipment to use when operating an outer perimeter of a system's coverage area (i.e., in the "marginal" area), the method and apparatus of the present invention provides an approach that is both automatic and transparent to the user. Basically, in the improved multi-radio of the present invention, an audio signal quality measurement is automatically obtained for each radio transceiver used in the apparatus and, on a continuing periodic basis, the quality currently obtainable on each transceiver is evaluated taking into account whether the evaluated transceiver is operating within a conventional or a trunked system. A determination is then made as to whether or not communications and control of the multi-radio apparatus should be switched over to a different transceiver.

In accordance with one aspect of the present invention, a multiple radio mobile transceiver apparatus having both a trunked system transceiver and a conventional RF transceiver is provided with a trunked/conventional auto-select capability (also called "E-C Autoset") that automatically selects the trunked system transceiver equipment for use whenever the audio quality on the trunked system is at or above a user-programmable minimum. A quality level preferred minimum is one chosen so as to provide the greatest coverage possible while preventing "ineffective" calls wherein user transmissions are too garbled to understand. The signal quality available on the trunked communications system is evaluated on a periodic basis whether or not a call is in progress. Whenever the signal quality degrades below the preset limit, the present invention automatically switches control to the transceiver equipment that operates using conventional RF communications. Moreover, the switching of control to the different transceiver equipment is accomplished electronically in a manner substantially transparent to the user. Thus, a mobile user is always provided with the ability to transmit (and receive) whether or not the quality of communications using the trunked RF system has degraded or become infeasible—for example, due to the user wandering outside the trunked system coverage area.

In accordance with another aspect of the present invention, a multiple radio mobile transceiver apparatus having at least two trunked system transceivers is provided with an "automatic radio roaming" feature that allows a user to freely roam between two (or more) trunked communications systems and it always selects the particular trunked system transceiver which provides the best audio quality. For example, when a mobile user is traveling near the limit of a coverage area corresponding to one trunked system, this auto-roaming feature of the present invention will cause the multi-radio to apparatus to automatically switch to another (albeit non-selected) trunked system transceiver whenever the measured audio quality on the selected transceiver degrades below a preprogrammed minimum.

Consequently, with the present invention, a mobile user needs no prior knowledge of the geographical coverage areas of the various RF communications systems available with the particular multi-radio apparatus. Moreover, a mobile user's concentration is not hampered by having to focus attention on operation of the radio equipment itself; to wit: switching between different communications systems and trying to determine whether he/she can be heard and understood. Instead, the transceiver selection is automated and overseeing the operation of the multiple radio equipment is greatly simplified. Moreover, for instances where a user would prefer to remain solely on the conventional system, the present invention has a transceiver autoselect disable feature that allows the user to disable the autoselecting of transceiver equipment for either a preprogrammed duration or until the user chooses to manually re-enable the automatic equipment selecting feature. In addition, the present invention also contemplates optional features such as providing the user with an audible indication whenever a "switch-over" to different radio transceiver equipment occurs.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so not to obscure the description of the present invention with unnecessary detail.

In the presently preferred embodiment of the invention, a multi-radio apparatus utilizes at least one radio transceiver operating on a digital trunked RF communications system and at least one other radio transceiver operating on a conventional non-trunked wide area RF communications system—e.g., VHF, UHF or any RF band-split that provides wide-area coverage. The multi-radio apparatus may also consist of a pair (or more) of trunked system radio transceivers with or without a conventional non-trunked radio transceiver. In accordance with one aspect of the present invention, a transceiver "autoselect" feature (also called "E-C autoset") provides automated selection between use of a trunked system transceiver and use of a conventional RF system transceiver. In accordance with another aspect of the present invention, an "automatic radio roaming" feature provides automated switching between two or more trunked system transceivers (when roaming within/between overlapping coverage areas of different trunked communications systems) depending on which transceiver can currently provide the best audio quality and which transceiver is preferred by the user. With both these features, automated switching between radio transceiver equipment within the multi-radio apparatus to make use of the "best" communications system, based on repeated assessments of the received audio quality available on each radio transceiver, is accomplished in a manner essentially transparent to the user.

Figure 1A:
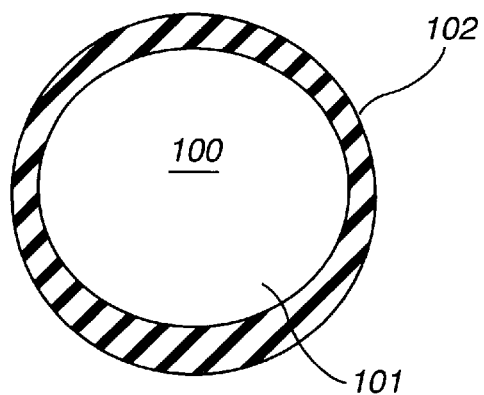
FIG. 1A is an example illustration of the normal and marginal coverage areas of a simple digital trunked communications system.
Figure 1B:
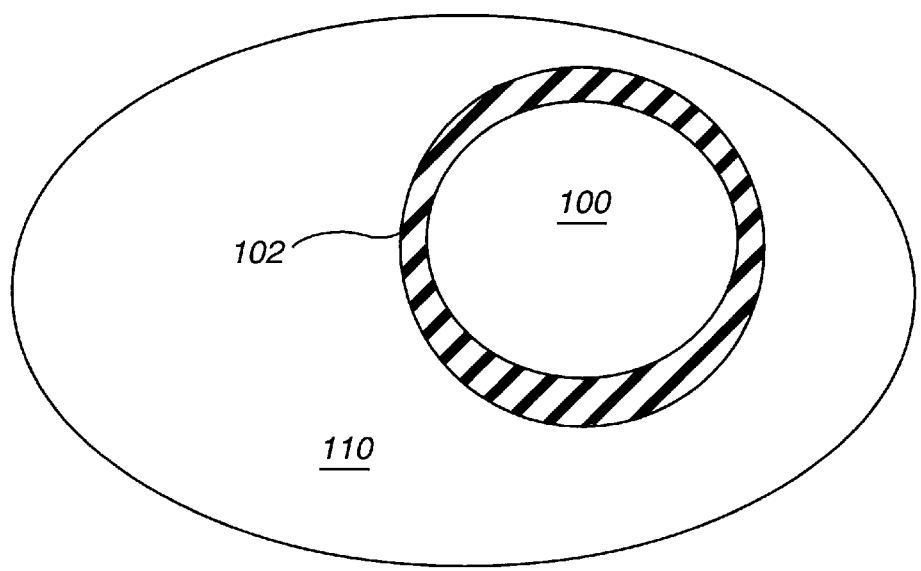
FIG. 1B is an illustration of the normal and marginal coverage areas of a trunked communications system within a larger wide-area conventional type RF communications system.

The diagram of FIG. 1A illustrates an expected high quality coverage area 101 and an associated marginal coverage area 102 for a simple digital trunked communications system 100. FIG. 1B shows the normal and marginal coverage areas of the same communications system 100 within a larger wide-area "conventional" type wide-area RF communications system 110. In a first example scenario for illustrating the present invention, it is assumed that the RF communications systems available to a mobile user consist of trunked RF communications system 100 and conventional RF communications system 110, as illustrated in FIG. 1B. In this situation, a transceiver autoselect feature, implemented by an auto-select control task (ASCT) routine (discussed in greater detail below), automatically selects the trunked system transceiver equipment over the conventional RF system equipment for use whenever the audio quality on the trunked system is at or above a user-programmable minimum.

Figure 1C:
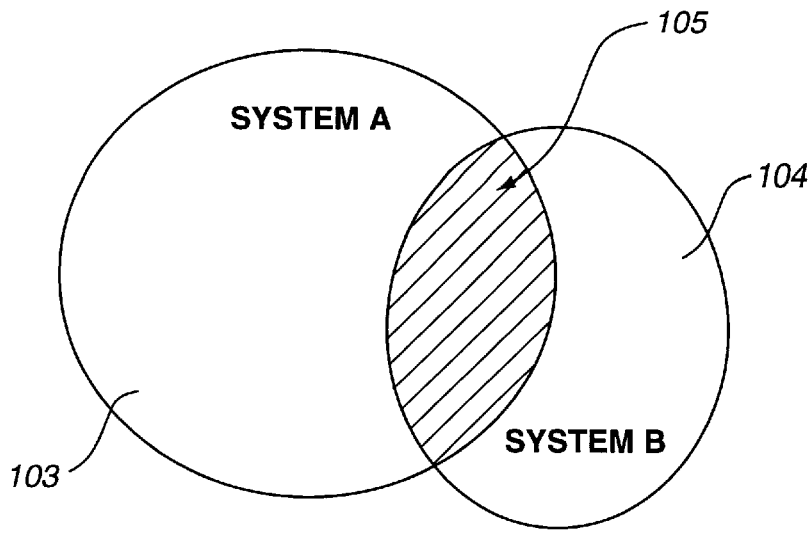
FIGS. 1C and 1D are illustrations of different scenarios for overlapping coverages of two trunked communications systems.

In a second example scenario for illustrating the present invention, it is assumed that the RF communications systems available to the mobile user consist of two overlapping trunked RF communications systems and that the multi-radio apparatus includes at least two trunked system transceivers. In this scenario, FIGS. 1C and 1D each illustrate respective coverage areas for two possible example configurations of overlapping trunked communications systems. With reference to FIG. 1C, the two trunked communications systems, system A and system B, having respective coverage areas 103 and 104, exhibit a small coverage overlap area 105. (Both trunked communications systems A and B also have an associated "marginal" coverage area not shown in these figures). In a first example situations, it is assumed that a mobile user having a multi-radio apparatus starts out traveling within the coverage area for system B—but outside of the coverage are for system A (i.e., outside overlap coverage section 105)—while operating the multi-radio apparatus with the radio transceiver associated with system B as the "selected" or preferred radio. As the user travels into overlap area 105, both communications systems A and B become available for use. In accordance with the automatic radio roaming feature of the present invention, while the user is in the overlap region, the ASCT routine automatically controls the multi-radio apparatus to use the particular trunked system transceiver that has the best received audio quality available at that location. As the user leaves the coverage area for communications system B, audio quality on system B will of course degrade. The ASCT routine detects this quality degradation and automatically switches to the radio transceiver associated with system A.

Figure 1D:
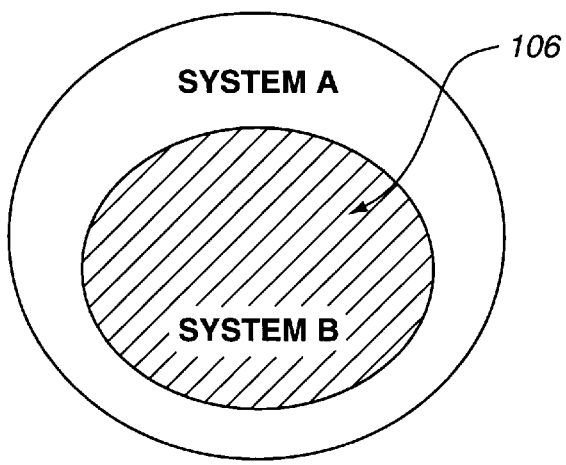

Referring now to FIG. 1D, a different situation is shown wherein trunked communications system B is wholly contained within the coverage area of trunked communications system A. In this situation, the coverage overlap region, 106, constitutes essentially all of communications system B. Assume a user starts traveling outside the coverage area of system B with the radio transceiver equipment associated with communications system A set as the "selected" radio. As the user travels into overlap region 106, the ASCT routine automatically selects the radio with the best audio quality, but with a preference toward using the selected system A. If while roaming in overlap region 106, the user passes into an area where the signal from surrounding system A somehow fades, the ASCT routine automatically selects the transceiver for system B so that the multi-radio apparatus is at all times capable of communication. Moreover, a user-programmable option allows a preference to be set for a particular radio—in this case the radio associated with system A—so that after the signal from system A returns to normal, control will be returned to that radio, even though the signal from system B is still strong.

Figure 2:
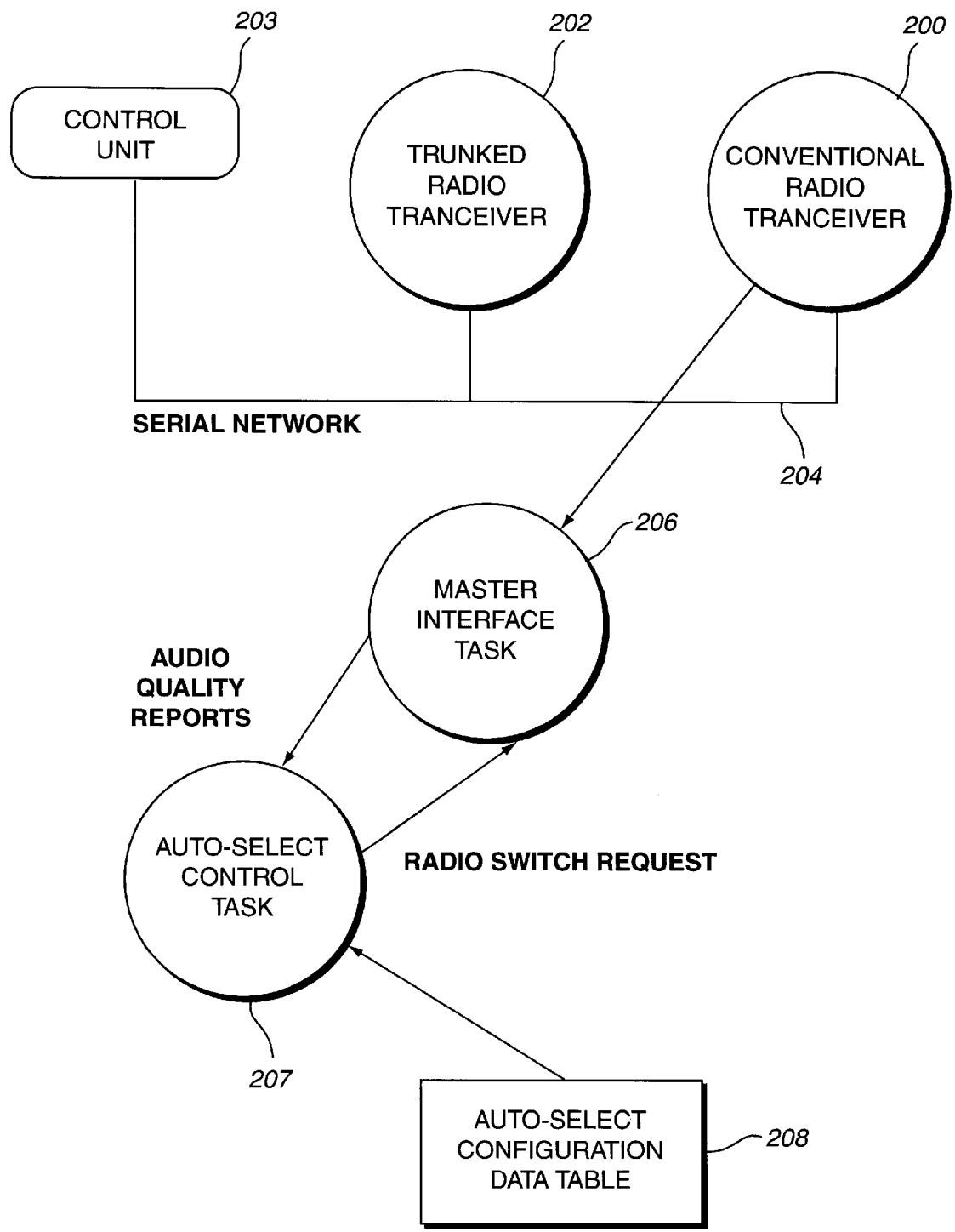
FIG. 2 is a schematic block diagram illustrating the multi-radio apparatus internal serial network bus and associated control task diagrams in accordance with the present invention.

Referring to now to FIG. 2, a basic schematic block diagram of the multi-radio hardware arrangement and interface/control task routines in accordance with the present invention is discussed in greater detail. Although the multi-radio arrangement of the present invention is not limited to any particular number of transceivers, a first example embodiment discussed herein consists of an arrangement having at least two transceivers (200 and 202) with a common control unit (203). One of the two transceivers operates on a digital trunked communication system, and the other functions as a conventional RF communications radio whose band split provides a larger geographical coverage area than the trunked system. Control unit 203 (also called a "head" unit) provides the external controls and readouts found on most conventional RF communications equipment for manual access and is similarly microprocessor controlled. It may also include a display panel, but more particularly, it serves as a general user interface for providing conventional RF transceiver front panel type operational controls for which ever radio is the currently "selected" radio.

In a preferred embodiment, the transceivers of the multi-radio apparatus exchange control information with control unit 203 and each other via common bus 204 using any standard form of serial interface network protocol to allow communication between the transceivers and the control unit. In essence, the arrangement constitutes a sort of local network within the multi-radio apparatus. Each transceiver—and other active devices on the bus such as control unit 203—incorporate a microprocessor controller that includes appropriate task management and serial interface routines for operating and communicating with other devices on the bus forming the multi-radio apparatus local network. For the purpose of handling ongoing RF communications, one of the two (or more) transceivers on bus 204 is designated as a "master" radio and the other(s) as "slave(s)". In the example arrangement depicted in FIG. 2, transceiver 200 operates on a conventional RF communications system and is the master. The other transceiver, 202, operates using a trunked RF communications system and is the slave in this arrangement. The master radio supports the multi-radio local network through the use of an associated master interface task routine (master task 206) resident in memory associated with the microprocessor controller of the master radio. The master task processes messages from all devices in the network connected to bus 204—consequently, the particular serial protocol employed for the network must allow all devices on bus 204 to communicate with master task 206.

When the multi-radio apparatus is operated in an automatic mode, a subroutine task of master task 206 controls which transceiver on bus 204 is selected for providing communications. The particular transceiver that is selected is the one over which RF communication should take place—referred to herein as the "selected radio"—is also placed in control over audio output, the user input interface and the display of control unit 203. Each device in the multi-radio apparatus has a unique digital ID number associated with it that it provides with messages sent over bus 204. This ID is placed in a byte appended to all communications over the bus and facilitates proper routing of operational control messages throughout the apparatus. For example, if control unit 203—having an ID "8"—detects a pressed key-pad button, it sends a message to master task 206 at the master radio along with a key-press record and its ID "8". The master radio—having, for example, ID "9"—receives the key-press record and determines that slave radio 202 is currently the "selected radio" and, consequently, should receive the key-press record. It, therefore, forwards a separate message containing the key-press record and the ID "9" over bus 204, which is picked up by slave radio 202.

As a user "keys up" the multi-radio apparatus "push-to-talk microphone, a transmission is sent out on the "selected" radio transceiver. Preferably, a particular control unit keypad button is predefined for the purpose of enabling the user manually to change the selected radio transceiver. Whenever a radio change command is made by pressing that predefined keypad button, the master task is instructed to switch the selected radio to a different transceiver. In addition, various other "rules" of operational preference for controlling the switching of the selected radio transceiver equipment are contemplated as being implemented by the master task routine. For example, a switch radio request may be selectively inhibited or delayed when a radio is actively transmitting.

In accordance with a preferred embodiment to the present invention, trunked radio 202 provides a measure of its audio quality to master task 206 on a regular (i.e., periodic) basis. A detailed description and discussion of the operation of a preferred technique for measuring the overall audio fidelity of a communications channel based on the received signal strength is set forth in commonly assigned U.S. Pat. No. 5,553,243 to Harrison et al., issued Sep. 3, 1996, entitled "Method And Apparatus For Determining With High Resolution The Fidelity Of Information Received On A Communications Channel" and is incorporated herein by reference. In the same fashion, a similar report is regularly provided to the master task from conventional radio 200 along with an indication that the transceiver is "conventional" and therefore does not have an associated audio quality measurement.

In the present invention, regular audio quality reports are sent by the radios to the master task and are monitored to provide an "auto-select" radio switching feature wherein the controlling radio is automatically selected without user intervention. To effect radio auto-selection, the master task has access to configuration data (stored in the associated microprocessor memory) that is pre-programmed by the user. This data includes a minimum "quality level" value that indicates a signal of acceptable audio quality. When each audio quality measurement is received from the respective transceivers of the multi-radio apparatus, the master radio compares it to the pre-programmed minimum acceptable level and determines if the trunked system can provide at least the acceptable minimum signal quality. Whenever the conventional RF communications system transceiver of the multi-radio apparatus is in control (i.e., is the "selected" radio), and the monitored trunked communications system signal changes from poor to good, the master task initiates a switch between transceivers to pass control to the trunked radio. Similarly, whenever the trunked radio is in control and the trunked system signal quality changes from good to poor, the master task initiates an equipment switch over to the conventional radio—which then assumes control. Accordingly, an appropriate radio transceiver within the multi-radio apparatus is automatically selected such that the user will always be using the particular transceiver system—i.e., either conventional or trunked—that provides the best signaling quality.

This radio audio-selection process, hence referred to as the auto-select control task (ASCT), is a sub-process of the master interface task routine. Referring again to FIG. 2, certain radio auto-selection configuration data, 208, is provided by the user (or manufacturer) and stored in master radio 200 along with master interface task routine 206 at system initialization. This stored information is accessible by the user and contains user selected values for the minimum audio quality that would be considered as "acceptable" for transmission over the trunked radio transceiver, as well as the maximum allowable number of such "unacceptable" samples permitted before switching the selected radio. ASCT, 207, obtains the periodic audio quality reports from master task 206 and evaluates the status of each of the radios. In the presently preferred embodiment, the ASCT then evaluates the received audio quality report information to determine which radio should be selected according to the user defined configuration information, 208, in a manner illustrated by the following truth table:

| CURRENTLY SELECTED RADIO | TRUNKED RADIO AUDIO QUALITY | RADIO TO SELECT |
| --- | --- | --- |
| Conventional | Below Minimum | Conventional |
| Conventional | Equal to or Greater Than Minimum | Trunked |
| Trunked | Below Minimum | Conventional |
| Trunked | Equal to or Greater Than Minimum | Trunked |

When existing conditions indicate that the radio to be used should be other than the currently selected radio, the ASCT places a radio switch request with the master task. For the first example embodiment discussed above, the "conventional" radio is automatically selected for communications whenever the trunked system audio quality is below the acceptable minimum, as illustrated by the above truth table. In a similar manner, the ASCT also provides automatic radio transceiver switching during roaming between two digital trunked communications systems.

Figure 3:
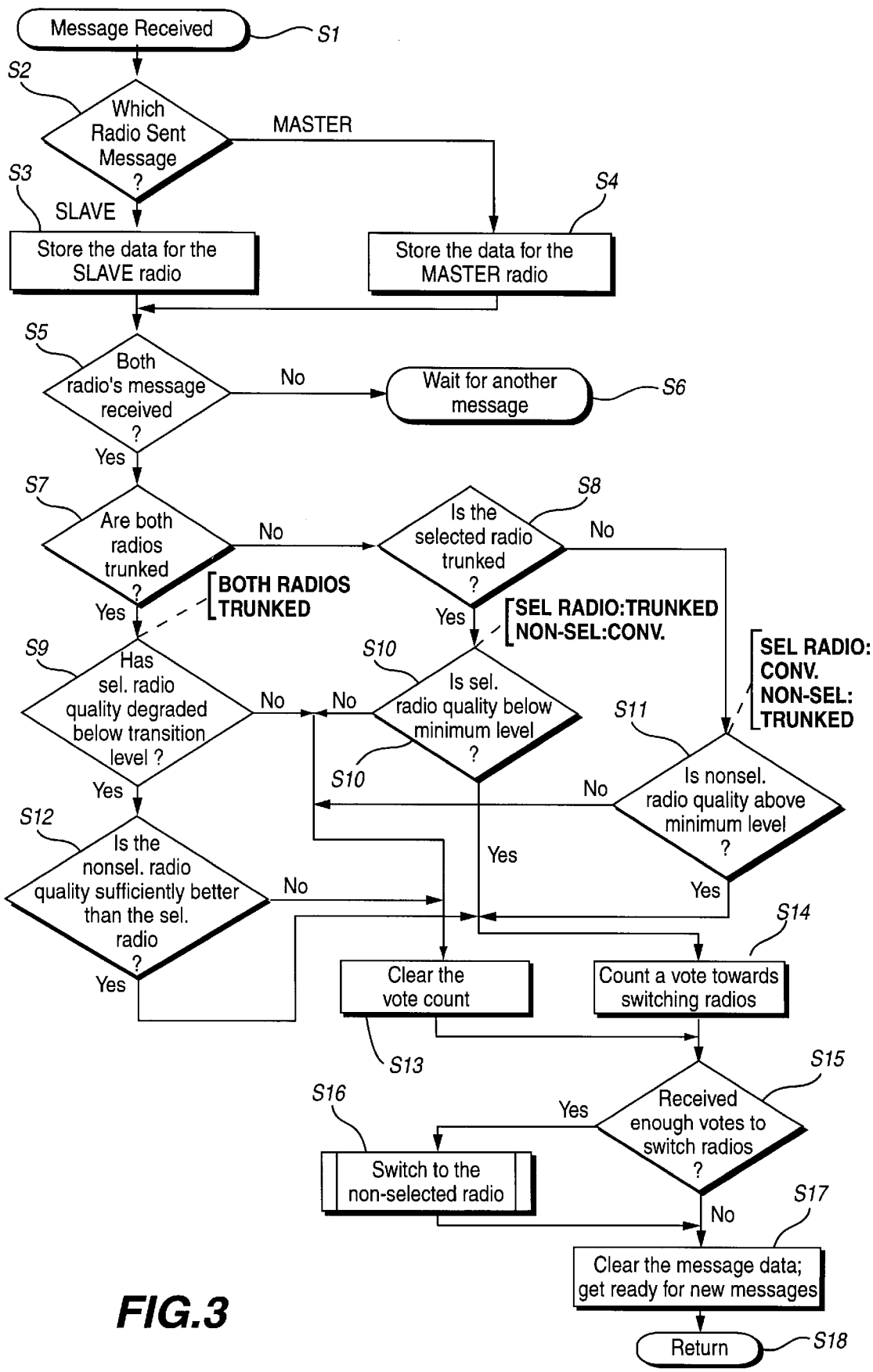
FIG. 3 is an flow chart of an auto-select control task routine in accordance with the present invention.

Referring now to FIG. 3, a flow chart of an example program routine for the Master Interface Task/ASCT is discussed. For this simple example, the multi-radio apparatus consists of only two transceivers (i.e., a master radio and a slave radio). Messages containing audio signal quality data are reported to the master interface task (MIT) by each radio (transceiver) via the bus on a regular periodic basis. As a message containing a current audio signal quality sample is reported, the MIT/ASCT examines the message ID to determine which radio (transceiver) placed the message on the bus (e.g., master or slave) and then saves the sample data associated with each particular radio (S1–S4) in dedicated memory locations. Once the MIT/ASCT routine receives audio signal quality sample data from all of the radios in the multi-radio (S5–S6), it can make a determination as to which radio should be "selected" for current communications. In order to do this, the MIT/ASCT first assesses (via polling or any other convenient method) whether the transceivers in the multi-radio apparatus are both trunked radio systems or whether one is a conventional RF transceiver (S7–S8). For the case where both transceivers are trunked radios, a determination is made as to whether the currently "selected" radio has a current audio quality sample value that is below the predetermined user-programmed minimum value (S9). If the current audio quality value reported by the selected radio has degraded below the predetermined minimum, then the most recent audio quality value reported by the non-selected radio is checked to determine if it is sufficiently better than the audio quality available on the selected radio (S12). If the quality reported by the non-selected radio is better, the current sample counts as a vote toward switching radios (S14). Votes are stored in memory and are accumulated over subsequent samples. On the other hand, if the currently reported selected radio quality value has not degraded below the predetermined minimum, or if the non-selected radio quality is not sufficiently better than the selected radio quality, then the vote count for switching radios is cleared (S13). For the case where one of the radios is trunked and the other operates on a conventional system, the ASCT routine first assesses whether the current "selected" radio is the trunked radio (S8). If the current selected radio is a trunked system radio, its audio quality value (obtained from the current sample) is compared with the predetermined minimum value (S10). If the current sample is below the minimum level, it counts as a vote toward switching radios (S14). However, if the current sample is above the predetermined minimum, the vote count is cleared (S13). Similarly, if the currently "selected" radio is the conventional system transceiver, then the ASCT checks to see if the current audio quality value from the non-selected trunked radio is above the predetermined minimum value (S11). If it is, the sample counts as a vote toward switching radios, otherwise, the vote count is cleared (S13, S14).

If a predetermined number of votes to switch radios are accumulated, then the ASCT initiates a switch-over to the non-selected radio transceiver (S16). If an insufficient amount of votes exist to switch to the non-selected radio, then the current audio quality value data for each radio is cleared and the ASCT awaits for further report messages (S17, S18).

Although not explicity disclosed herein, suitable software for implementation of the present invention, including the master interface task routine, the auto-select control task and the individual serial interfaces for other devices in the above described multi-radio network, may be readily implemented by a digital RF communications system programmer of ordinary skill in this art without undue experimentation when taking into account the general architectural arrangement of the disclosed multi-radio apparatus hardware, the accompanying task routine flow charts and the contemplated digital network interfacing requirements specified herein.

While the invention has been described in connection with what is presently considered to be the most practical and preferred embodiment, it is to be understood that the invention is not to be limited to the disclosed embodiment, but on the contrary, is intended to cover various modifications and equivalent arrangements includes within the spirit and scope of the appended claims.

What is claimed is:

1. In a multiple radio communications apparatus having both trunked and conventional transceiver equipment, a transceiver selection arrangement for automatically switching between transceiver equipment for communicating via a trunked radio frequency (RF) communications system and transceiver equipment for communicating via a conventional RF communications system, comprising:

a multiple radio equipment serial data communications bus connecting each transceiver of said multi-radio apparatus so as to create a hard-wired local network between transceivers for exchanging data and command information;

a trunked communications transceiver connected to the bus and having a microprocessor controller including means for determining audio quality of a receiver RF signal;

a conventional RF communications transceiver connected to the bus and having a microprocessor controller;

a multiple radio communications apparatus control-head unit connected to the bus, said control-head unit providing a user interface for inputting information and controlling a transceiver connected to the bus; and a transceiver auto-select means for automatically selecting and switching RF communications control between transceivers based on a determination of a presently available level of audio quality attainable via the trunked communications system, said transceiver auto-select means utilizing a user-programmable memory containing alterable auto-selection configuration data including an audio signal quality value representing a minimum acceptable quality level for communications over said trunked RF communications system.

2. In a multiple radio communications apparatus having both trunked and conventional transceiver equipment, a method for automatically switching between transceiver equipment for communicating via a trunked radio frequency (RF) communications system and transceiver equipment for communicating via a conventional RF communications system, said apparatus including a user-programmable memory containing alterable transceiver auto-selection data, comprising the steps of:

sampling a received RF signal of each trunked communications transceiver on a periodic basis;

determining an available audio quality measurement value for each trunked communications transceiver based at least in part on a received signal strength;

comparing an audio quality measurement value of each trunked communications transceiver against a predetermined threshold value stored in said user-programmable transceiver auto-selection memory, said threshold value representing a minimum acceptable quality level for trunked communications; and selecting the conventional RF communications system transceiver under a condition that a trunked RF communications system transceiver is currently in use and develops a measured audio quality value below the threshold value and selecting a trunked RF communications system transceiver under a condition that an available audio quality value corresponding to a trunked communications transceiver is at or above the threshold value, wherein the selected transceiver equipment assumes control over ongoing communications in a manner that is transparent to a user.

3. The multiple radio communications apparatus as set forth in claim 2, wherein said auto-selection data further comprises a value representing a maximum allowable number of unacceptable audio signal quality samples obtained said trunked system transceiver before switching a transceiver.

4. In a multiple radio communications apparatus having a plurality of trunked RF communications system transceivers, each transceiver operating on a different trunked communications system, said apparatus including a user-programmable memory containing alterable transceiver auto-selection data and said apparatus comprising a selected transceiver for conducting ongoing trunked communications and at least one other non-selected transceiver, a method for implementing an automated roaming feature that provides for automatically switching from a selected trunked system transceiver to a non-selected trunked system transceiver among said plurality of trunked system transceivers, comprising the steps of:

sampling a received RF signal of each trunked system transceiver on a periodic basis;

determining an audio quality value for each transceiver based at least in part on a received signal strength;

determining if an audio quality value for said selected transceiver has degraded below a predetermined threshold value stored in said user-programmable memory as transceiver auto-selection data, said threshold value representing a minimum acceptable quality level for trunked communications, and if the audio quality value for said selected transceiver has degraded below said predetermined minimum quality threshold value;

comparing an audio quality value of each non-selected transceiver to an audio quality value of said selected transceiver; and selecting and switching to a non-selected transceiver if the audio quality value of a non-selected transceiver is substantially better than the audio quality of said selected transceiver, wherein a selected transceiver assumes control over ongoing communication in a manner that is transparent to a user.

5. The multiple radio communications apparatus as set forth in claim 4, wherein said auto-selection data further comprises a value representing a maximum allowable number of unacceptable audio signal quality samples obtained from each trunked system transceiver before switching a selected transceiver.

6. In a multi-radio RF transceiver apparatus having both trunked and conventional wide-area RF communications transceiver radios, wherein said radios are each individually microprocessor controlled and include memory and appropriate control software, and wherein each said microprocessor controlled radio is connected via a common bus allowing exchange of control information between microprocessors of each radio to form a local multi-radio network and includes interface task software for communicating with other radios and devices connected to said bus, an automated radio selection arrangement, comprising:

a master interface task program routine executed by a microprocessor controller associated with a radio transceiver in said multi-radio apparatus, said master interface task routine regularly receiving audio signal quality information from at least each trunked communications system transceiver via said common bus and determining which radio in said multi-radio apparatus is selected to provide RF communications based on predetermined minimum acceptable signal quality value levels;

a user-programmable memory containing alterable transceiver auto-selection data, said auto-selection data comprising at least an audio signal quality value representing minimum acceptable quality levels for each radio in said multi-radio apparatus, said user-programmable memory associated with said transceiver microprocessor controller; and an auto-select control task, operating as a sub-process of said master interface task, said auto-select control task effecting said master task to automatically select a radio transceiver to provide and control current RF communications in response to a comparison of said regularly received audio signal quality information with auto-selection data stored in said user-accessible memory.

7. The multi-radio RF transceiver apparatus according to claim 6, wherein communication between radios and other devices connected to said common bus in the multi-radio network is in the form of serial digital messages.

8. The multi-radio RF transceiver apparatus according to claim 6, wherein each radio or device connected to said common bus has an associated ID for facilitating communications within the multi-radio network.

9. The multi-radio RF transceiver apparatus according to claim 7, wherein said messages include a portion containing ID information indicating a radio or device which originated said messages.

10. A multi-radio communication apparatus including both trunked and conventional wide-area RF transceivers, comprising:

a digital trunked communications transceiver having a microprocessor controller;

a conventional wide-area RF communications transceiver having a microprocessor controller;

a multi-radio apparatus control-head unit having user-interface transceiver controls;

a user-programmable memory containing alterable auto-selection data, said auto-selection data comprising an audio signal quality value representing a minimum acceptable quality level for each radio in said multi-radio apparatus; and a common serial digital communications bus connected to the digital trunked communications transceiver, the wide-area RF communications transceiver, and the control unit to form a local multi-radio network for exchanging control information between transceivers and said control unit, wherein said multi-radio communication apparatus includes an auto-select control task program routine executed by at least one microprocessor controller associated with a transceiver in said multi-radio apparatus, said auto-select control task determining which transceiver to be used based on a comparison of available audio signal quality against auto-selection data stored in said user-accessible memory.

* * * * *